(12) United States Patent  
Tachikawa et al.

(10) Patent No.: US 8,947,890 B2  
(45) Date of Patent: Feb. 3, 2015

(54) FIXING COMPONENT FOR DETACHABLY COUPLING AN ELECTRONIC COMPONENT TO AN ELECTRONIC APPARATUS

(75) Inventors: Tadanori Tachikawa, Kawasaki (JP); Hideki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 201 days.

(21) Appl. No.: 13/186,084

(22) Filed: Jul. 19, 2011

(65) Prior Publication Data

US 2012/0162954 A1    Jun. 28, 2012

(30) Foreign Application Priority Data

Dec. 28, 2010   (JP) .................................. 2010-294283

(51) Int. Cl.
*H05K 7/04* (2006.01)
*G06F 1/16* (2006.01)

(52) U.S. Cl.
CPC .................................... *G06F 1/1635* (2013.01)
USPC ....................... 361/809; 361/679.58; 361/747

(58) Field of Classification Search
CPC ... H05K 5/0221; G06F 1/1635; G06F 1/1658; E05B 63/18; E05B 65/006
USPC ............. 361/747, 754, 802, 809, 679.58, 801
See application file for complete search history.

(56) References Cited

U.S. PATENT DOCUMENTS

| | | | | |
|---|---|---|---|---|
| 5,465,191 A | * | 11/1995 | Nomura et al. | 361/679.27 |
| 8,169,785 B2 | * | 5/2012 | Hiratomo | 361/730 |
| 2009/0008948 A1 | * | 1/2009 | Ho et al. | 292/179 |
| 2010/0136398 A1 | * | 6/2010 | Chen et al. | 429/100 |

FOREIGN PATENT DOCUMENTS

| | | |
|---|---|---|
| JP | 06-089126 | 3/1994 |
| JP | 7-030263 A | 1/1995 |
| JP | 9-088917 A | 3/1997 |
| JP | 11-345038 | 12/1999 |
| JP | 2000-022347 A | 1/2000 |
| JP | 2001-068082 A | 3/2001 |

OTHER PUBLICATIONS

JPOA—Office Action of Japanese Patent Application No. 2010-294283 dated Jul. 1, 2014 with Partial English Translation.

* cited by examiner

*Primary Examiner* — Anatoly Vortman
*Assistant Examiner* — Jacob Crum
(74) *Attorney, Agent, or Firm* — Fujitsu Patent Center

(57) ABSTRACT

A fixing component fixes a detachable component to a housing of an electronic apparatus. The fixing component includes a first operating portion, a first engaging portion and a second operating portion. The first operating portion is configured to receive a movement operation in a first direction and to permit movement in a second direction intersecting the first direction. The first engaging portion is connected to the first operating portion and is configured to release engagement with the detachable component when the first operating portion is moved in the second direction. The second operating portion is connected to the first engaging portion and is configured to receive a movement operation in the second direction.

10 Claims, 23 Drawing Sheets

FIXING COMPONENT FOR DETACHABLY COUPLING AN ELECTRONIC COMPONENT TO AN ELECTRONIC APPARATUS

CROSS-REFERENCE TO RELATED APPLICATIONS

This application is based upon and claims the benefit of priority from the prior Japanese Patent Application No. 2010-294283 filed on Dec. 28, 2010, the entire contents of which are incorporated herein by reference.

FIELD

An embodiment relates to a fixing component that detachably fixes a component to a housing of an electronic apparatus and to the electronic apparatus.

BACKGROUND

There are known electronic apparatuses each including a component detachably mounted in a housing. For example, a structure in which a battery pack is detachably mounted in a housing is frequently applied to a battery-powered portable electronic apparatus. The housing has a fixing structure using a fixing component such as to attach and fix such a battery pack to the housing.

A portable electronic apparatus is subjected to various external forces when carried. For this reason, the fixing structure for the battery pack is preferably such that the battery pack is not easily detached by the external forces. Accordingly, an example of a fixing structure for a battery pack includes a lock component that slides in a first direction (hereinafter also referred to as an X-direction) into engagement with the battery pack, and a lever component that slides in a second direction perpendicular to the X-direction (hereinafter also referred to as a Y-direction) so as to permit and inhibit the slide of the lock component.

That is, in a state in which the battery pack is fixed by being engaged with the lock component, the lever component inhibits movement (slide) of the lock component. The lever component is biased to a position such as to inhibit movement of the lock component. The lock component is moved only when the lever component moves against the biasing force so as to permit movement of the lock component (movable state). Therefore, the battery pack is unfixed only when the external force for operating the lever component and the external force for operating the lock component act simultaneously.

Since the fixing structure for the battery pack uses two components, namely, the lock component and the lever component so as to serve the above-described function. This increases the component cost. Further, to detach the battery pack, the user is required to perform difficult operations with both hands, that is, to operate the lever component with one hand and operate the lock component with the other hand.

In a fixing structure of the related art, lock claws are elastically supported by a slidably held lid, and engage with projections provided in a housing so as to serve a lock function. In another fixing structure of the related art, a pin is inserted in a hole of a housing to push an unlock portion of a lid, whereby the lid is unlocked and is permitted to move.

In the fixing structure of the related art, the fixed lid is unlocked by pushing a button or the like in a direction (Z-direction) perpendicular to a plane (XY plane) including the moving direction of the lid. However, in the above-described fixing structure including the lock component and the lever component, a plane including the moving direction of the lock component and a plane including the moving direction of the lever component are the same (XY plane). Therefore, it is difficult for the fixing structure including the lock component and the lever component to merely adopt the fixing structure of the related art.

Accordingly, there is a demand to develop a fixing component that can reduce the number of components and manufacturing cost while maintaining the function of the known fixing structure including the lock component and the lever component.

SUMMARY

According to an embodiment, a fixing component fixes a detachable component to a housing of an electronic apparatus. The fixing component includes a first operating portion, a first engaging portion and a second operating portion. The first operating portion is configured to receive a movement operation in a first direction and to permit movement in a second direction intersecting the first direction. The first engaging portion is connected to the first operating portion and is configured to release engagement with the detachable component when the first operating portion is moved in the second direction. The second operating portion is connected to the first engaging portion and is configured to receive a movement operation in the second direction.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the various embodiments.

DETAILED DESCRIPTION OF THE EMBODIMENTS

Figure 1:
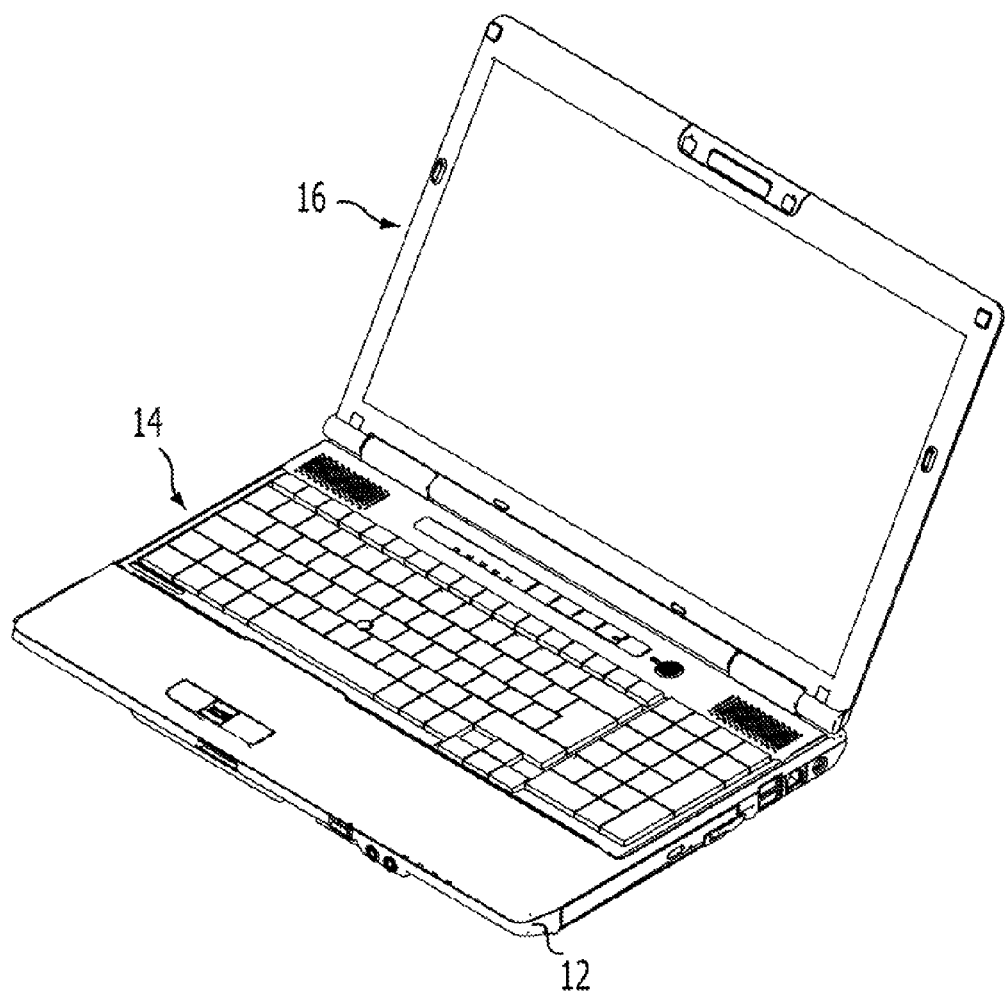
FIG. 1 is a perspective view of a notebook computer according an embodiment.
Figure 2:
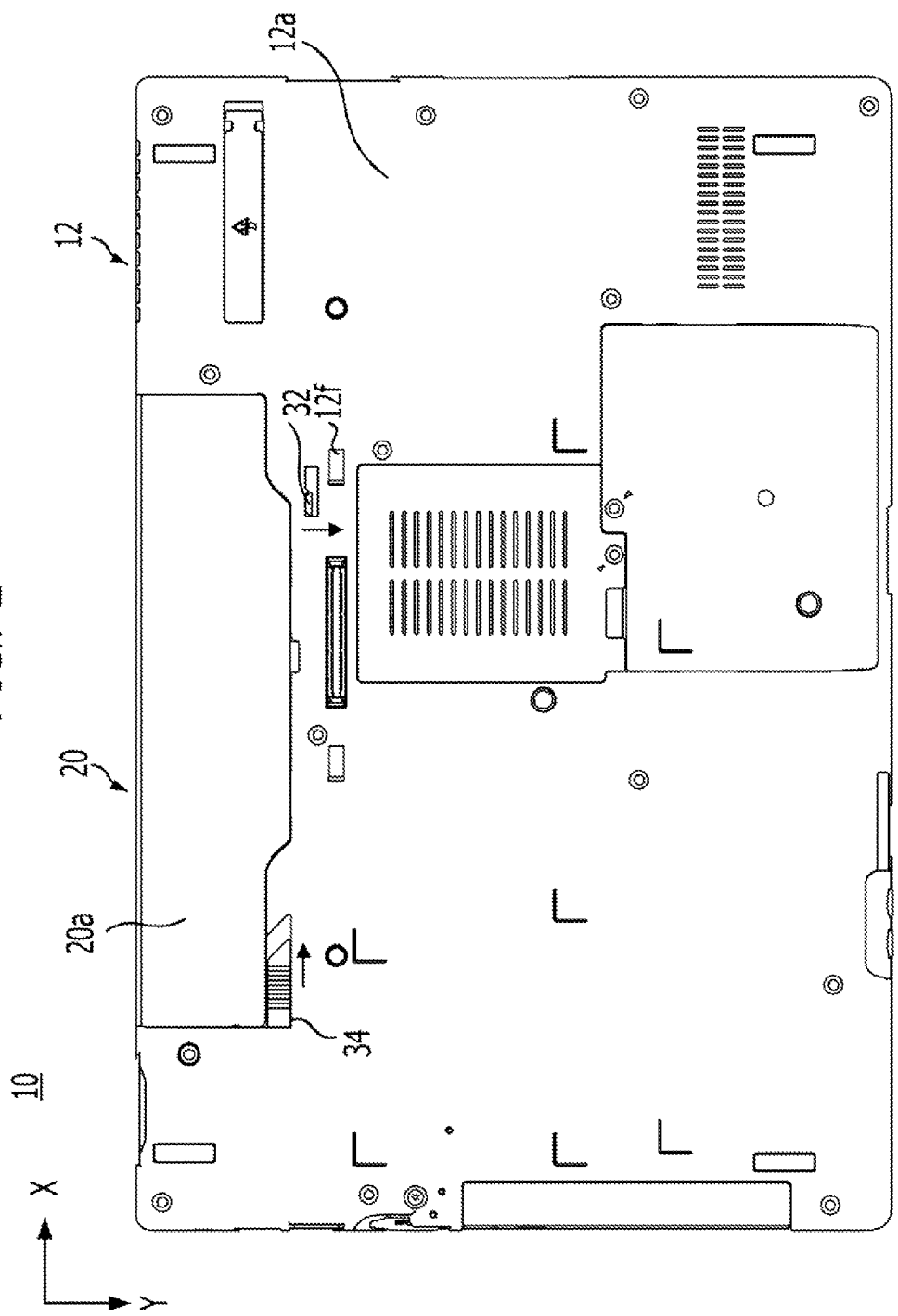
FIG. 2 is a plan view of a bottom surface of the notebook computer.

FIG. 1 is a perspective view of a portable personal computer (notebook computer) 10 including a housing in which a battery-pack fixing component according to an embodiment is assembled. FIG. 2 is a plan view of a bottom surface of the notebook computer 10 illustrated in FIG. 1.

The notebook computer 10 includes a main body 14 having a housing 12, and a display panel unit 16 pivotally mounted on one side of the main body 14. The housing 12 is generally formed by a plastic material, and incorporates components such as a circuit board, a storage device, and an input/output device. The notebook computer 10 is a portable electronic apparatus, and is designed to be compact and light such as to be easily carried by the user.

The notebook computer 10 includes a battery as an internal power supply, and runs on power from the battery. The battery is interchangeably mounted as a battery pack 20 in the housing 12 of the notebook computer 10. As illustrated in FIG. 2, an outer surface 20a of the battery pack 20 forms a part of a bottom surface 12a of the housing 12 of the notebook computer 10. The notebook computer 10 may run not only on the battery, but also on an external power supply.

The embodiment relates to a fixing component that mounts and fixes the above-described battery pack 20 in the housing 12. While the notebook computer is given as an example of an electronic apparatus in the description of the embodiment, the fixing component is also applicable to various electronic apparatuses other than the notebook computer. In particular, when the fixing component is applied to a portable electronic apparatus that is subjected to various external forces when carried, it provides a great advantage. The component mounted and fixed in the housing is not limited to the battery pack, and may be other components such as a hard disk drive and a memory. Further, the component may be a cover or lid that closes an opening of the housing after the component is put in the housing through the opening.

The battery pack 20 is mounted and fixed as a detachable component in the housing 12, but is detachable from the housing 12. To detach the battery pack 20, the user first pulls down a lever 32 (moves the lever 32 in the Y-direction away from the battery pack 20 in FIG. 2) so as to permit movement of a slide knob 34. That is, the lever 32 is biased toward the battery pack 20, and is usually placed at a position such as to inhibit movement of the slide knob 34. The lever 32 needs to be pulled down in order to permit movement of the slide knob 34.

The user moves the slide knob 34 in a state in which the slide knob 34 is unfixed by pulling down the lever 32 (moves the slide knob 34 in the X-direction of FIG. 2 in which the lever 32 extends), so that the battery pack 20 is unfixed and is permitted to be detached from the housing 12. In the embodiment, the lever 32 and the slide knob 34 are formed as an integral component (fixing component 30 in FIG. 4). Thus, it is unnecessary to separately mount, in the housing 12, a component including the lever 32 (that is, a component that permits and inhibits movement of the slide knob 34) and a component including the slide knob 34 (that is, a component to be engaged with the battery pack 20 for fixing). This reduces the number of components and assembly man-hours.

Since the lever 32 and the slide knob 34 are combined into the single fixing component 30, when the slide knob 34 moves, the lever 32 also moves in the same direction. Therefore, a lever opening 12f from which the lever 32 projects is provided in the housing 12 and in a size such that the lever 32 can also move in the lateral direction (X-direction). In this structure, the fixing component 30 formed by the combination of the lever 32 and the slide knob 34 is moved in the lateral direction by moving the lever 32 in the lateral direction while pulling down the lever 32. That is, when the lever 32 is pulled down and is then moved in the lateral direction, the slide knob 34 moves to unfix the battery pack 20. Therefore, the user can perform two operations, that is, an operation of unfixing the slide knob 34 by pulling down the lever 32 and a subsequent operation of unfixing the battery pack 20 by moving the slide knob 34, by operating the lever 32 with one hand. However, if it is difficult to operate the lever 32 with only one hand, the user may unfix the battery pack 20 with both hands, for example, by pulling down the lever 32 with one hand and moving the slide knob 34 with the other hand.

Next, the shape of the fixing component 30 will be described in detail.

Figure 3:
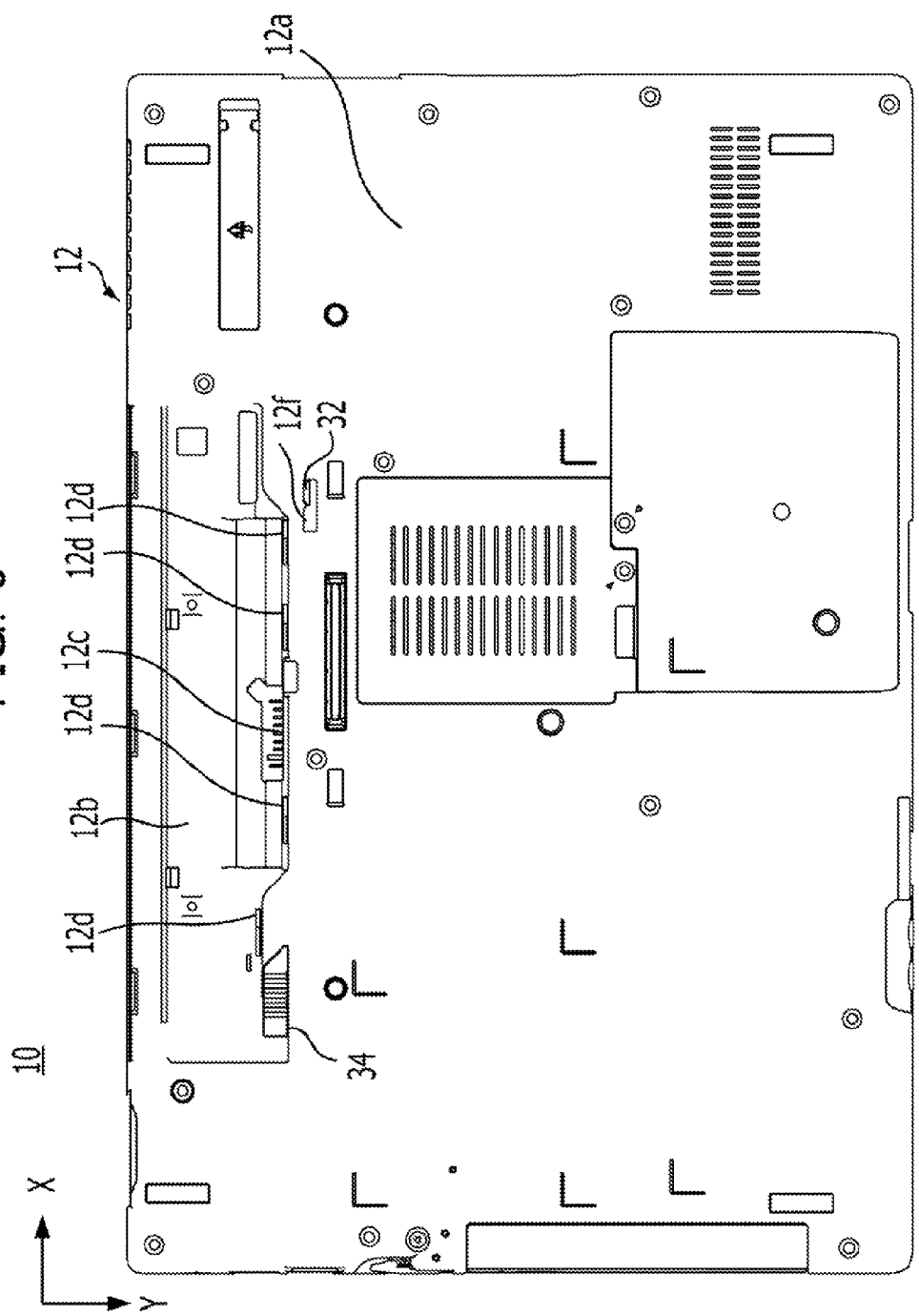
FIG. 3 is a plan view of the bottom surface of the notebook computer from which a battery pack is removed.
Figure 4:
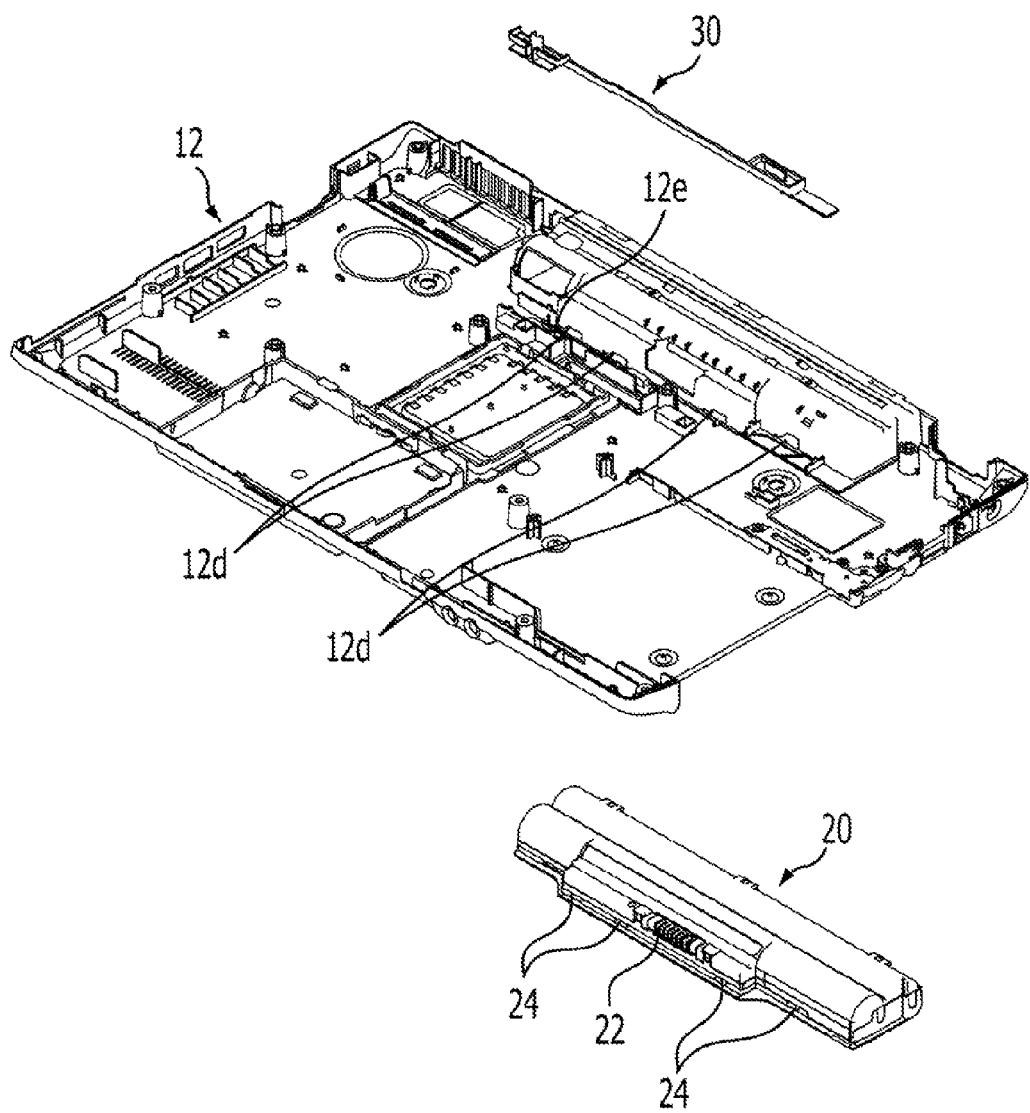
FIG. 4 is a perspective view of a housing from which a fixing component and the battery back are removed.

FIG. 3 is a plan view of the bottom surface of the notebook computer 10 from which the battery pack 20 is removed. FIG. 4 is a perspective view of the housing 12 from which the fixing component 30 and the battery pack 20 are removed.

First, the battery pack 20 serving as a detachable component will be described. As illustrated in FIG. 4, the battery pack 20 is formed by a case shaped like a long rectangular parallelepiped, and contains a battery (cell). In FIG. 4, the battery pack 20 is illustrated with a front side (outer surface 20a in FIG. 2) facing down.

The battery pack 20 has an electrode 22 on a back side (upper side in FIG. 4). When the battery pack 20 is put in a battery storage portion 12b of the housing 12, the electrode 22 of the battery pack 20 is connected to an apparatus-side electrode 12c provided in the inner part of the battery storage portion 12b, whereby power is supplied from the battery of the battery pack 20 to the notebook computer 10.

As illustrated in FIG. 4, claws 24 project from a side face of the battery pack 20. The claws 24 engage with the fixing component 30 to fix the battery pack 20. When the battery pack 20 is put in the battery storage portion 12b, the claws 24 provided on the battery pack 20 project in slits 12d provided in an inner wall of the battery storage portion 12b. As will be described below, engaging portions of a lock lever 36 of the fixing component 30 are movably provided in the slits 12d. When the fixing component 30 is moved, the engaging portions of the lock lever 36 engage with the claws 24 of the battery pack 20 in the slits 12d, whereby the battery pack 20 is fixed. A fixing operation and a fixing state of the battery pack 20 will be described below.

Figure 5:
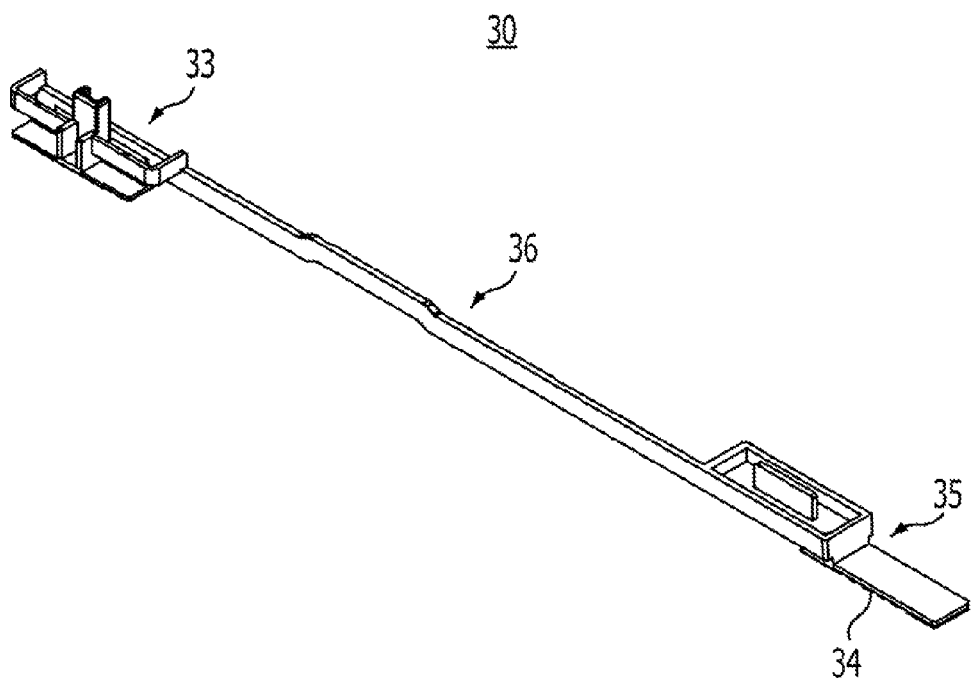
FIG. 5 is an enlarged perspective view of the fixing component of FIG. 4.
Figure 6:
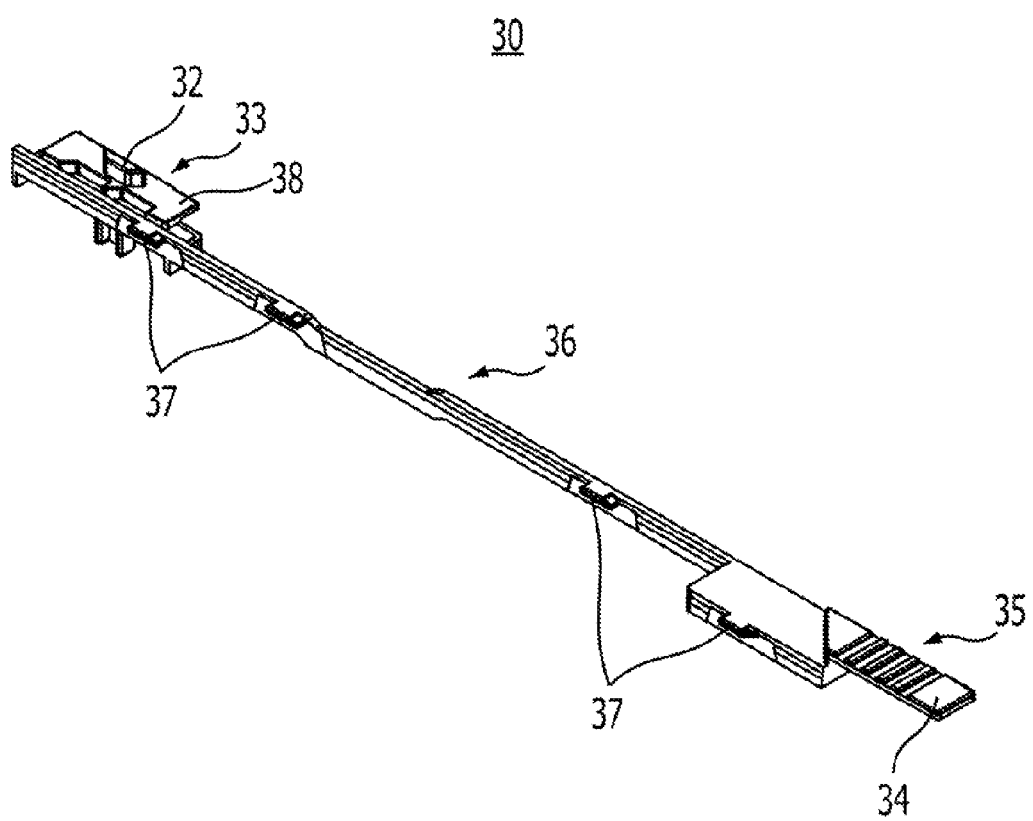
FIG. 6 is a perspective view of the fixing component of FIG. 5 that is turned upside down.

The shape of the fixing component 30 will be described below. FIG. 5 is an enlarged perspective view of the fixing component 30 of FIG. 4. FIG. 6 is a perspective view of the fixing component 30 of FIG. 5, which is turned upside down.

As described above, the fixing component 30 is formed by combining the lever 32 and the slide knob 34. The lever 32 is included in a first operating portion 33 to be operated by the user, and the slide knob 34 is included in a second operating portion 35 to be operated by the user. The first operating portion 33 including the lever 32 and the second operating portion 35 including the slide knob 34 are connected by the lock lever 36 serving as an example of a first engaging portion. As illustrated in FIG. 6, the lock lever 36 has a plurality of engaging portions 37. The engaging portions 37 are provided in the fixing component 30 in a manner such as to be located in the slits 12d when the fixing component 30 is mounted in the housing 12, as described above.

Figure 7:
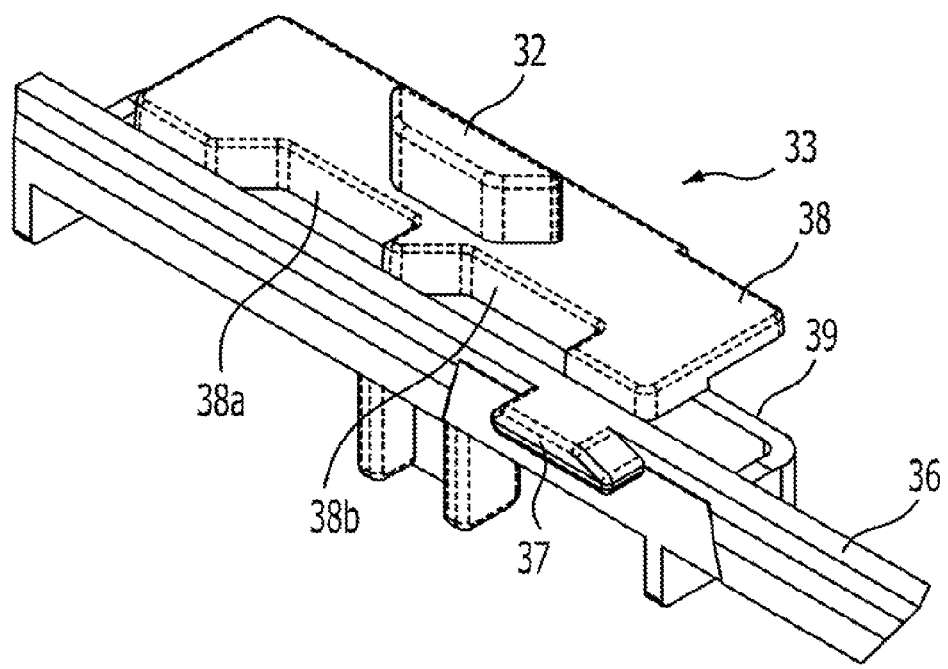
FIG. 7 is an enlarged perspective view of an end of the fixing component of FIG. 6.
Figure 8:
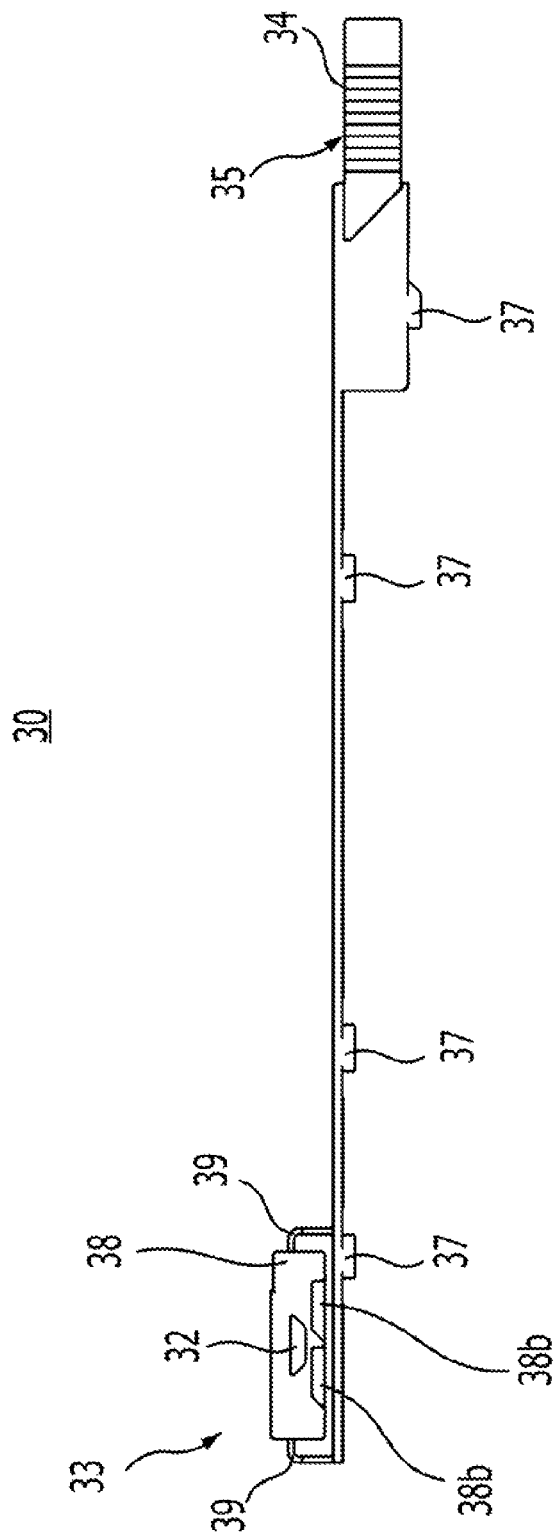
FIG. 8 is a plan view of the fixing component, as viewed from a lever and a slide knob.

The first operating portion 33 of the fixing component 30 also includes an engaging plate 38 on which the lever 32 is provided. FIG. 7 is an enlarged perspective view of the first operating portion 33 of FIG. 6. FIG. 8 is a plan view of the fixing component 30. The engaging plate 38 provided in the first operating portion 33 is connected to the lock lever 36 by an elastic connecting portion 39. The elastic connecting portion 39 is formed by an angular-U shaped thin plate that is easily elastically deformable.

That is, when a force in a direction away from the lock lever 36 is applied to the lever 32 on the engaging plate 38, the elastic connecting portion 39 elastically deforms, and the engaging plate 38 moves in the direction away from the lock lever 36. The direction away from the lock lever 36 corresponds to the direction in which the lever 32 is pulled down in FIG. 2. When the force applied to the lever 32 is removed, the deformed elastic connecting portion 39 recovers, and the engaging plate 38 including the lever 32 returns to its original position. In this way, the user can slightly move the engaging plate 38 by applying the operation force to the lever 32 and return the engaging plate 38 to its original position by removing the operation force.

As illustrated in FIG. 7, the engaging plate 38 has two engaging recesses 38a and 38b. The engaging recesses 38a and 38b are shaped to engage with an engaging projection 12e provided on the housing 12 (see FIG. 4). When one of the engaging recesses 38a and 38b engages with the engaging projection 12e, the fixing component 30 including the engaging plate 38 is fixed at that position. In particular, when the engaging recess 38a is engaged with the engaging projection 12e, even if the user tries to move the fixing component 30 by operating the slide knob 34, the engaging recess 38a and the engaging projection 12e do not disengage from each other, and the fixing component 30 does not move. In a state in which the fixing component 30 is placed at that portion, the battery pack 20 is fixed in the housing 12, as will be described below.

The second operating portion 35 of the fixing component 30 includes the slide knob 34. A connecting portion between the slide knob 34 and the lock lever 36 has a width substantially equal to the width of the slide knob 34 so as to ensure the strength of the connecting portion.

The fixing component 30 having the above-described structure is provided in the housing 12 in a manner such as to be movable along an outer wall of the battery storage portion 12b of the housing 12. In a state in which the fixing component 30 is placed movably along the outer wall of the battery storage portion 12b, the lever 32 of the fixing component 30 projects toward the bottom surface 12a of the housing 12 in the lever opening 12f of the housing 12. Further, the slide knob 34 is exposed from the bottom surface of the housing 12, and is able to be operated by the user. The engaging portions 37 of the fixing component 30 are located in the slits 12d of the battery storage portion 12b. Further, the engaging recess 38a provided in the engaging plate 38 of the fixing component 30 is engaged with the engaging projection 12e of the housing 12.

Next, an operation of fixing the battery pack 20 with the fixing component 30 will be described.

Figure 9:
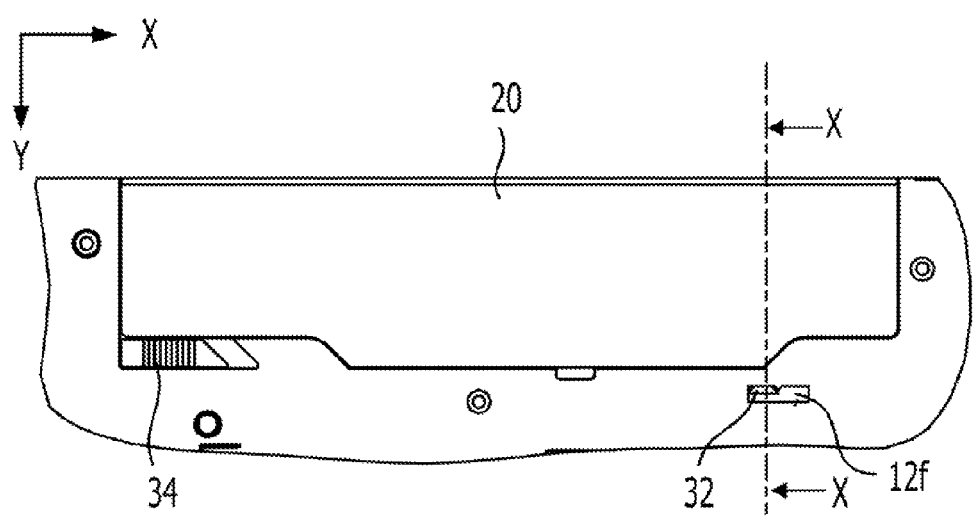
FIG. 9 illustrates a part of the bottom surface of the housing to which the battery pack is fixed.
Figure 10:
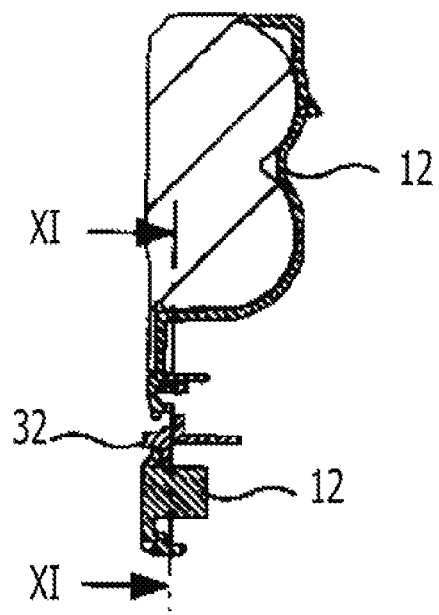
FIG. 10 is a sectional view, taken along line X-X of FIG. 9.
Figure 11:
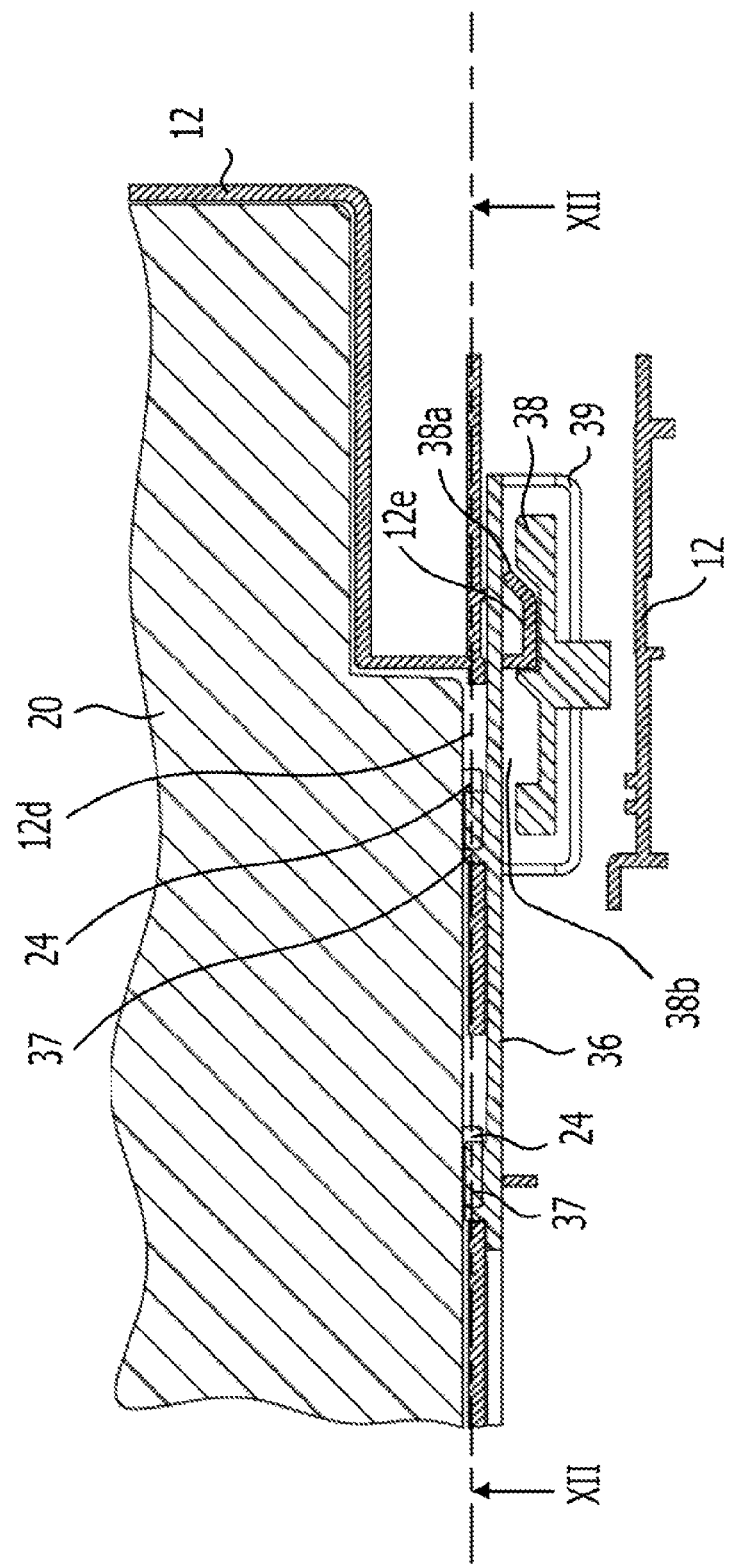
FIG. 11 is a sectional view of a portion of the fixing component near the end, taken along line XI-XI of FIG. 10.
Figure 12:
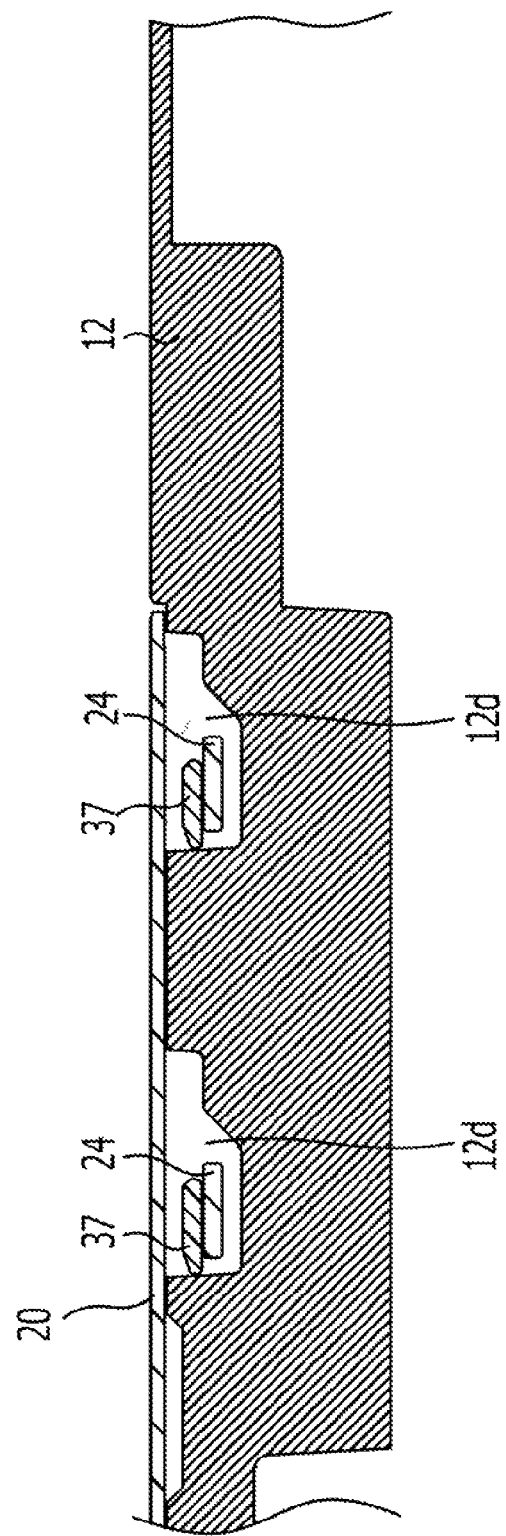
FIG. 12 is a sectional view, taken along line XII-XII of FIG. 11.

First, a description will be given of a state in which the battery pack 20 received in the battery storage portion 12b of the housing 12 is fixed to the housing 12 with the fixing component 30. FIG. 9 illustrates a part of the bottom surface of the housing 12 to which the battery pack 20 is fixed. FIG. 10 is a sectional view, taken along line X-X of FIG. 9. FIG. 11 is a sectional view of a portion of the fixing component 30 near the first operating portion 33, taken along line XI-XI of FIG. 10. FIG. 12 is a sectional view, taken along line XII-XII of FIG. 11.

In a state in which the battery pack 20 is fixed to the housing 12, as illustrated in FIG. 9, the slide knob 34 is at a position shifted to the right side in the X-direction. As illustrated in FIGS. 9 and 10, the lever 32 is located on an upper side in the Y-direction (on a battery pack 20 side) in the lever opening 12f. In this case, as illustrated in FIG. 11, the engaging recess 38a of the engaging plate 38 of the fixing component 30 is engaged with the engaging projection 12e of the housing 12. As illustrated in FIG. 11, a left side face (outer face) of the engaging projection 12e is perpendicular to the moving direction of the fixing component 30 (X-direction), and an inner left face of the engaging recess 38a is also perpendicular to the moving direction of the fixing component 30 (X-direction). Thus, the inner left face of the engaging recess 38a and the outer left face of the engaging projection 12e are in contact with each other. Hence, the fixing component 30 does not move to the left, but is fixed at that position (battery lock position).

In such a state in which the fixing component 30 is fixed at the battery lock position, the engaging portions 37 of the lock lever 36 are over the claws 24 of the battery pack 20 in the slits 12d, as illustrated in FIG. 12. Therefore, the claws 24 of the battery pack 20 are pressed by the engaging portions 37 of the fixing component 30, and the battery pack 20 is fixed to the housing 12.

Figure 13:
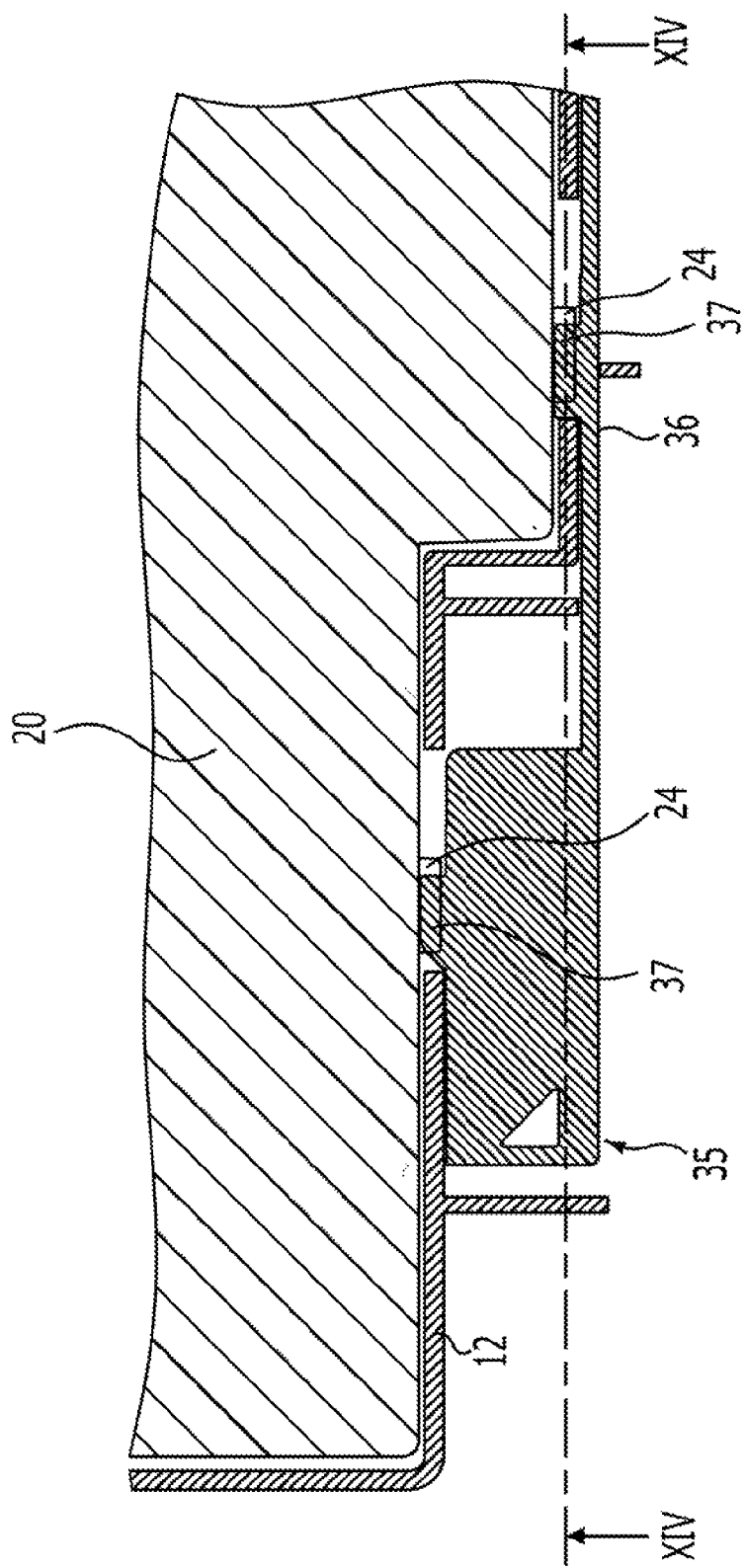
FIG. 13 is a sectional view of a portion of the fixing component near a second operating portion, taken along line XI-XI of FIG. 10.
Figure 14:
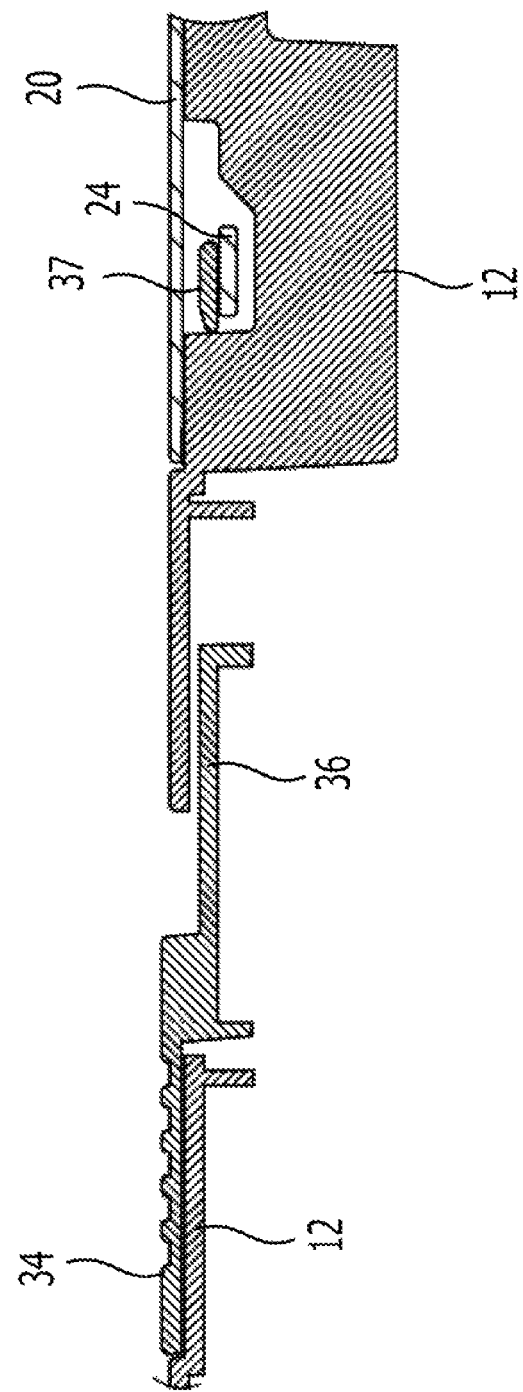
FIG. 14 is a sectional view, taken along line XIV-XIV of FIG. 13.

FIG. 13 is a sectional view of a portion of the fixing component 30 near the second operating portion 35, taken along line XI-XI of FIG. 10. FIG. 14 is a sectional view, taken along line XIV-XIV of FIG. 13. When the fixing component 30 is fixed at the battery lock position, as described above, the slide knob 34 provided in the second operating portion 35 of the fixing component 30 is at a position closer to the left side in the moving range, as illustrated in FIGS. 13 and 14. In the second operating portion 35, the engaging portions 37 of the lock lever 36 are also over the claws 24 of the battery pack 20 in the slits 12d. Therefore, the claws 24 of the battery pack 20 are pressed by the engaging portions 37 of the fixing component 30, and the battery pack 20 is fixed to the housing 12.

Figure 15:
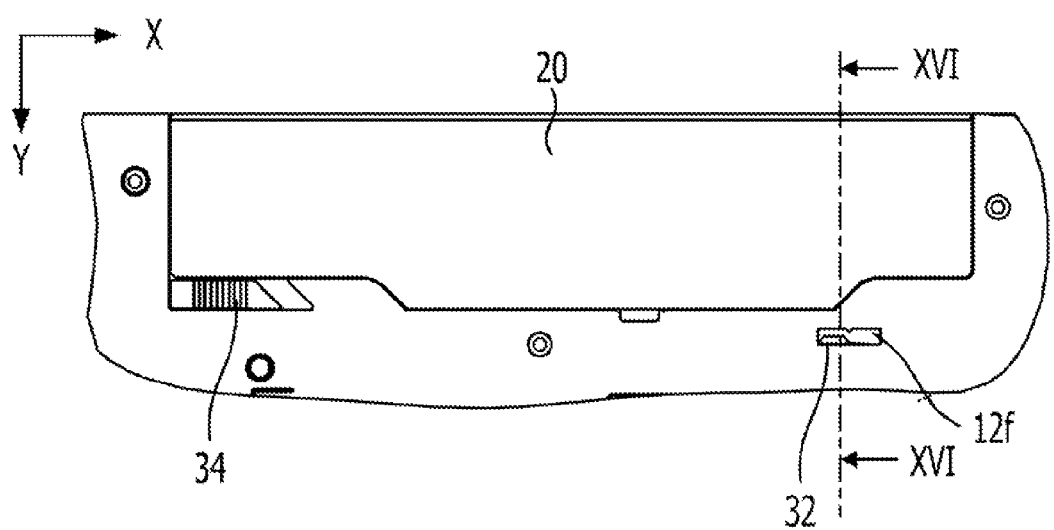
FIG. 15 illustrates the part of the bottom surface of the housing in which the lever for fixing the battery pack is pulled down.
Figure 16:
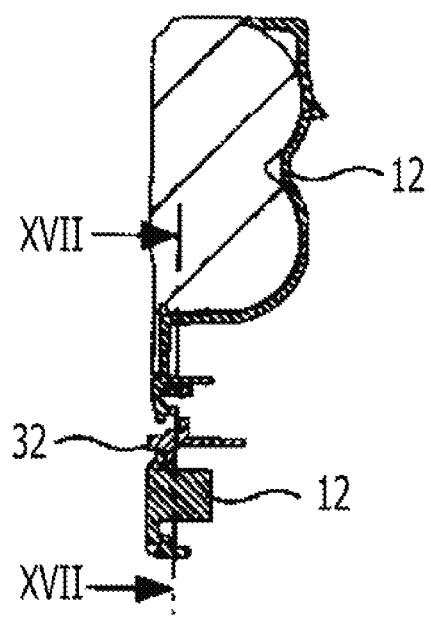
FIG. 16 is a sectional view, taken along line XVI-XVI of FIG. 15.
Figure 17:
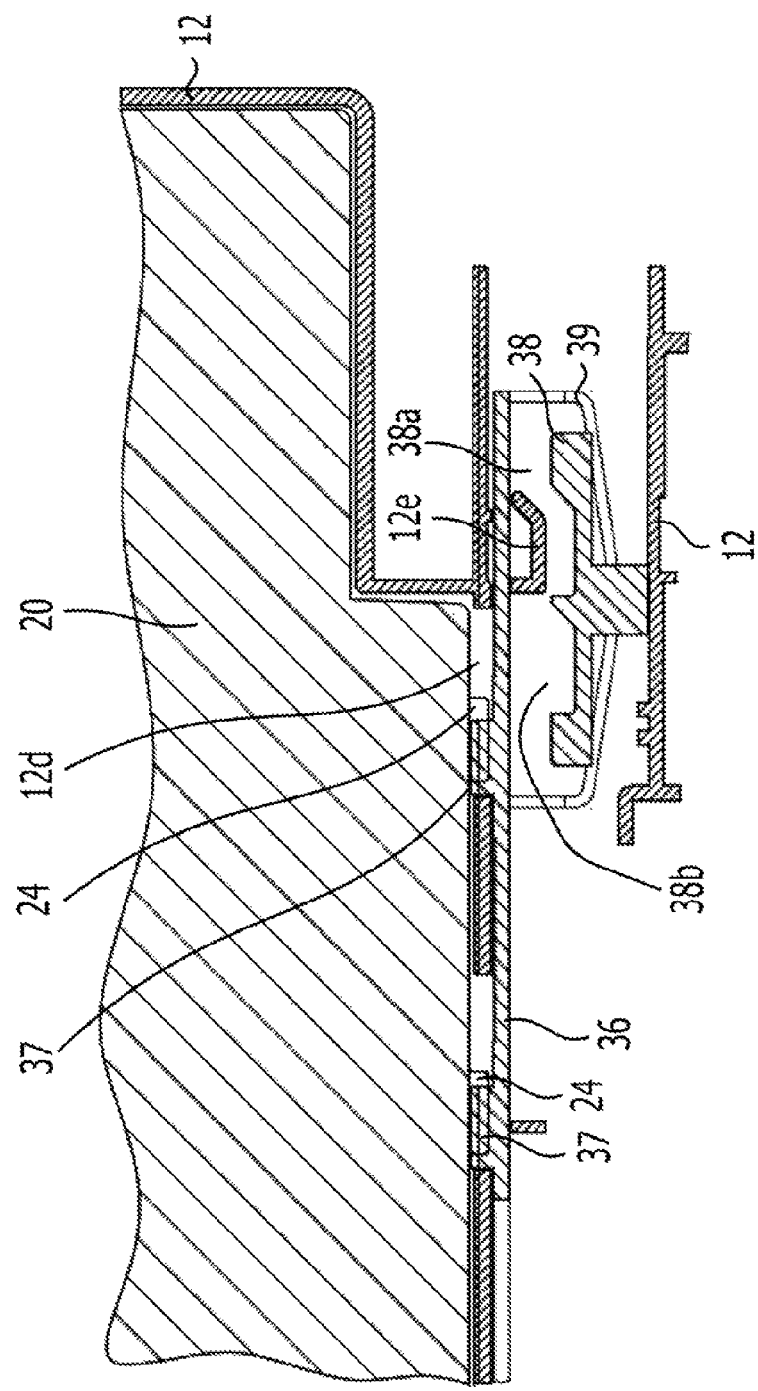
FIG. 17 is a sectional view of a portion of the fixing component near the end, taken along line XVII-XVII of FIG. 16.

To detach the fixed battery pack 20 from the housing 12, the user first unfixes the slide knob 34 by pulling down the lever 32 in the direction away from the battery pack 20 (Y-direction). FIG. 15 illustrates the part of the bottom surface of the housing 12 in which the lever 32 is pulled down. FIG. 16 is a sectional view, taken along line XVI-XVI of FIG. 15. FIG. 17 is a sectional view of the portion of the fixing component 30 near the first operating portion 33, taken along line XVII-XVII of FIG. 16.

To detach the battery pack 20 from the housing 12, as illustrated in FIG. 15, the user moves the lever 32 in the lever opening 12f in the Y-direction. Thus, the elastic connecting portion 39 that supports the engaging plate 38 elastically deforms and the lever 32 moves in the lever opening 12f toward the opposite side, as illustrated in FIG. 17. Since the engaging plate 38 moves together with the lever 32 in the direction away from the battery pack 20 (Y-direction), the engaging recess 38a of the engaging plate 38 moves out of engagement with the engaging projection 12e, as illustrated in FIG. 17. With this, the entire fixing component 30 including the lock lever 36 is unfixed, and the fixing component 30 is permitted to move in a direction parallel to the longitudinal direction of the battery pack 20 (X-direction perpendicular to Y-direction).

The fixing component 30 is ready to move in the X-direction in the above-described state in which the lever 32 is pulled down, but has not yet moved in the X-direction. Therefore, the engaging portions 37 of the fixing component 30 stay on the claws 24 of the battery pack 20, and the battery pack 20 is not unfixed, as illustrated in FIGS. 12 and 14.

Figure 18:
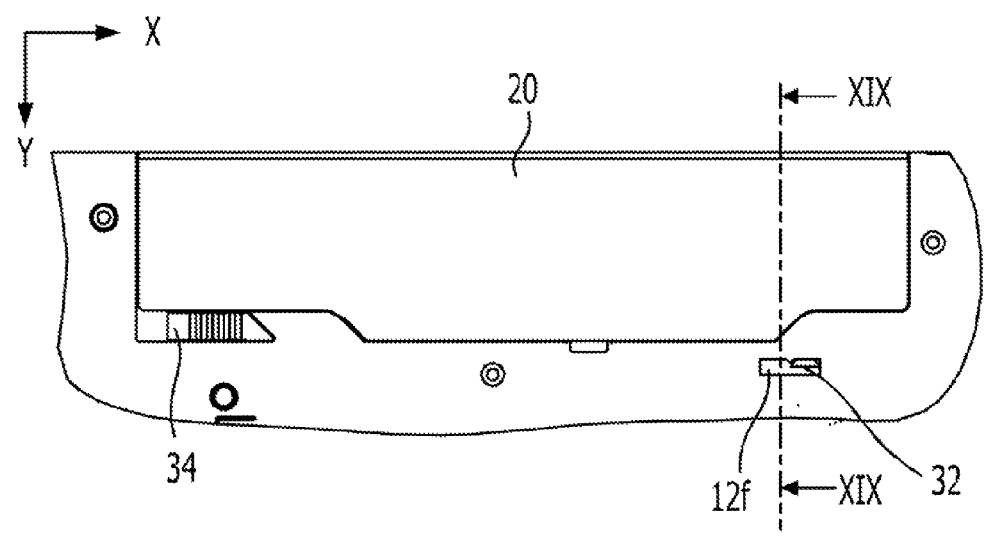
FIG. 18 illustrates the part of the bottom surface of the housing in which the battery pack is unfixed.
Figure 19:
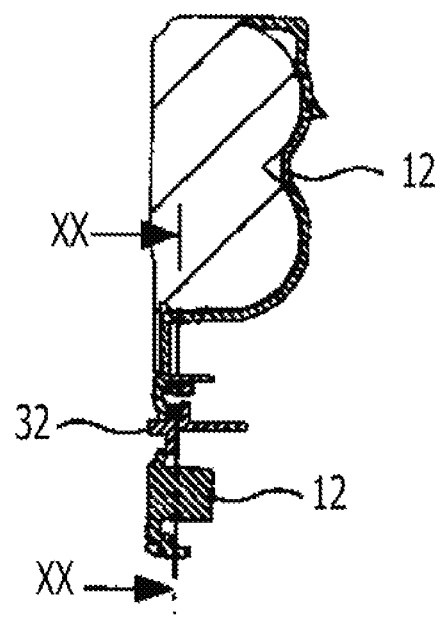
FIG. 19 is a sectional view, taken along line XIX-XIX of FIG. 18.
Figure 20:
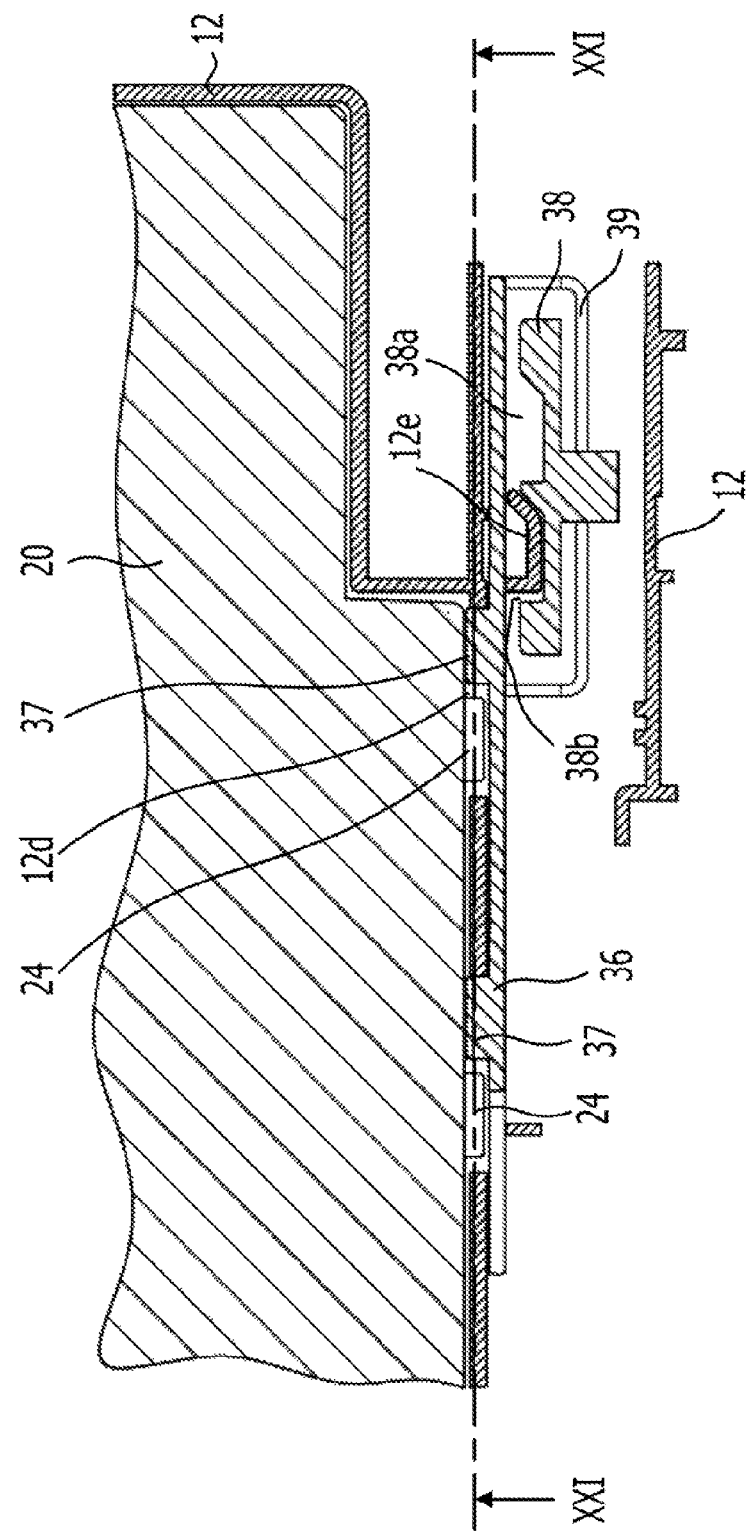
FIG. 20 is a sectional view of the portion of the fixing component near the end, taken along line XX-XX of FIG. 19.
Figure 21:
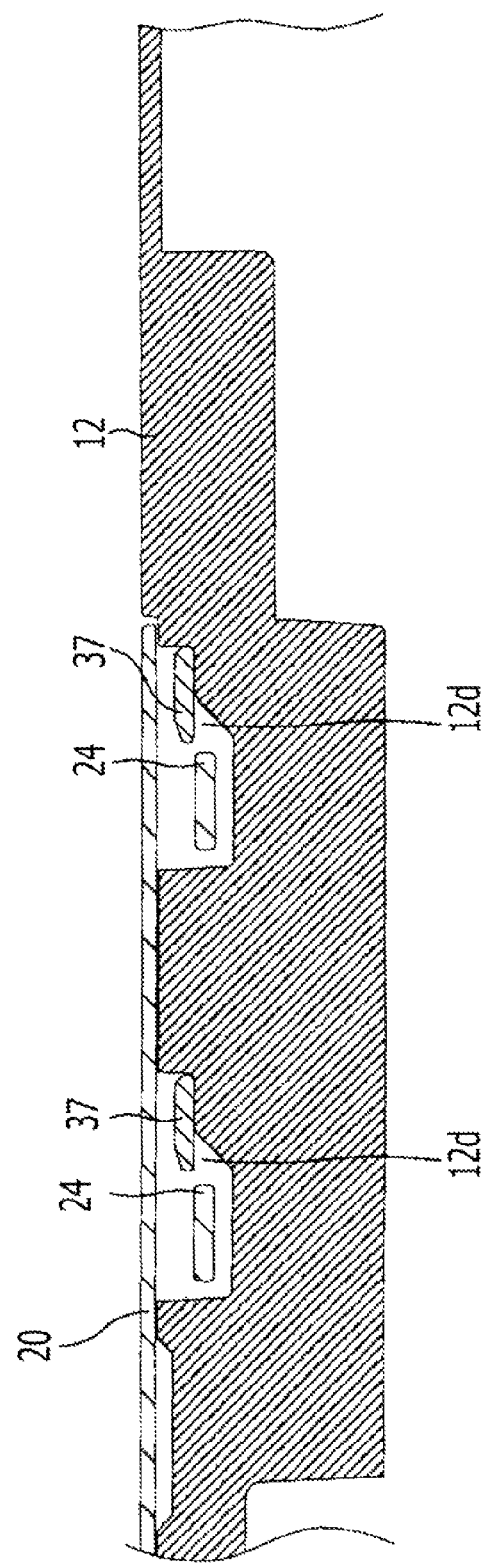
FIG. 21 is a sectional view, taken along line XXI-XXI of FIG. 20.
Figure 22:
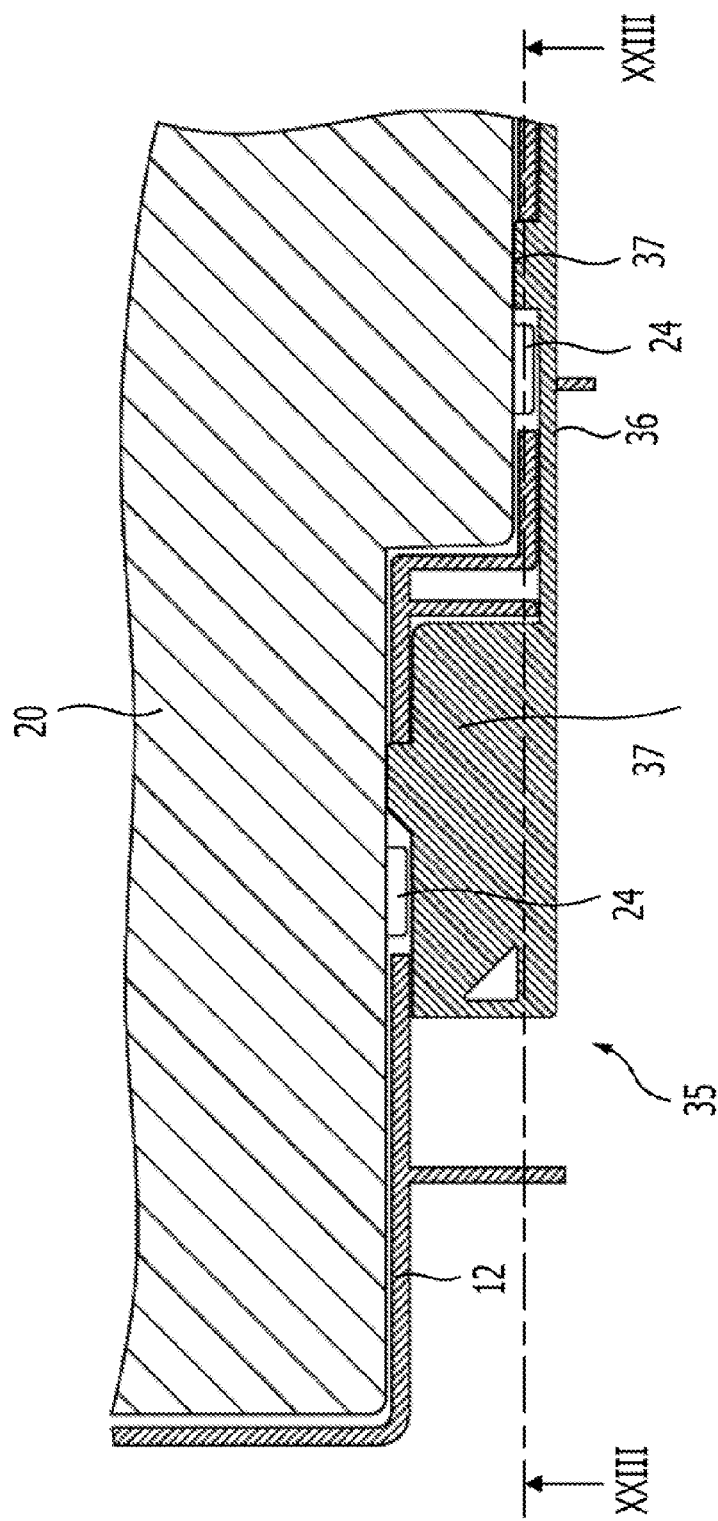
FIG. 22 is a sectional view of the portion of the fixing component near the second operating portion, taken along line XX-XX of FIG. 19.
Figure 23:
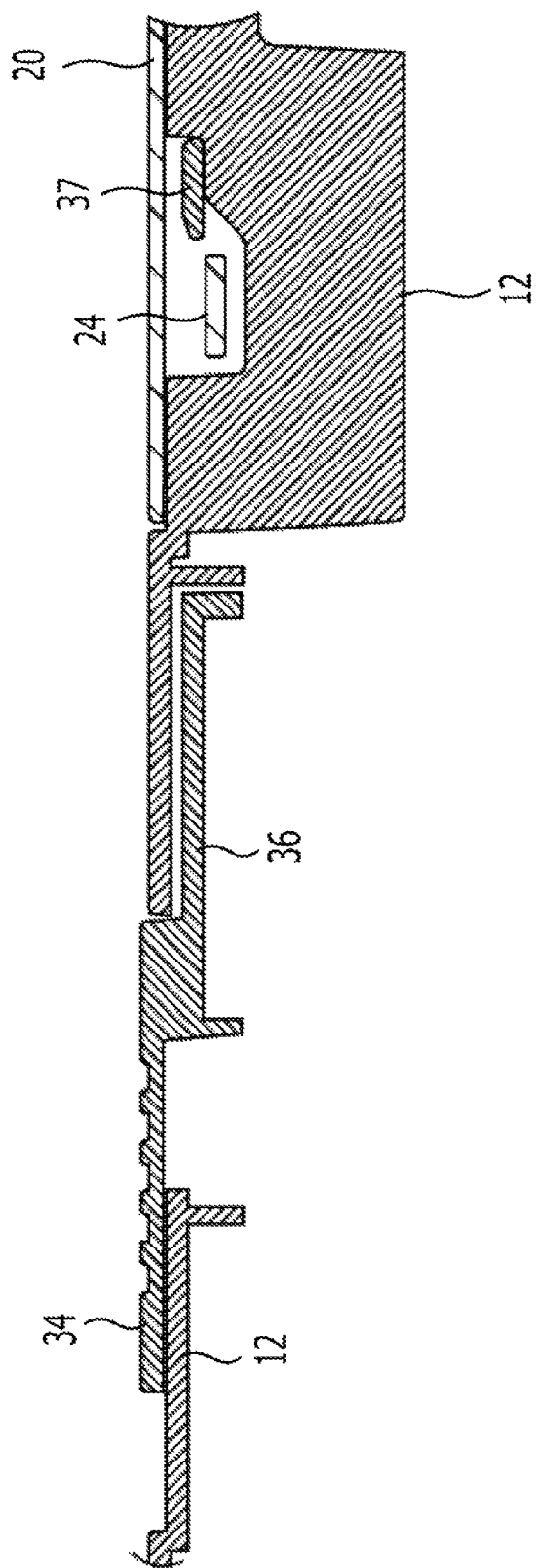
FIG. 23 is a sectional view, taken along line XXIII-XXIII of FIG. 22.

After pulling down the lever 32 so as to permit the fixing component 30 (slide knob 34) to move, the user moves the slide knob 34 in the X-direction so as to unfix the battery pack 20. FIG. 18 illustrates the part of the bottom surface of the housing 12 in which the battery pack 20 is unfixed. FIG. 19 is a sectional view, taken along line XIX-XIX of FIG. 18. FIG. 20 is a sectional view of the portion of the fixing component 30 near the first operating portion 33, taken along line XX-XX of FIG. 19. FIG. 21 is a sectional view, taken along line XXI-XXI of FIG. 20. FIG. 22 is a sectional view of the portion of the fixing component 30 near the second operating portion 35, taken along line XX-XX of FIG. 19. FIG. 23 is a sectional view, taken along line XXIII-XXIII of FIG. 22.

In the state in which the lever 32 is pulled down (moved in the Y-direction), when the user moves the slide knob 34 in the X-direction, as illustrated in FIG. 18, the entire fixing component 30 including the lock lever 36 and the first operating portion 33 moves in the X-direction. Therefore, the lever 32 and the engaging plate 38 in the first operating portion 33 also move in the X-direction, and the engaging recess 38b engages with the engaging projection 12e of the housing 12. This fixes the fixing component 30 at that position.

When the fixing component 30 moves in the X-direction, the engaging portions 37 provided in the lock lever 36 also move in the slits 12d in the X-direction, and are disengaged from the claws 24 of the battery pack 20, as illustrated in FIGS. 20 to 23. This state means that the battery pack 20 is unfixed. That is, since the engaging portions 37 move to positions disengaged from the claws 24 of the battery pack 20, the claws 24 can move upward, and the user can detach the battery pack 20 from the battery storage portion 12b of the housing 12 by raising the entire battery pack 20.

Through the above operations, the user can unfix and detach the battery pack 20 from the housing 12. To fix the battery pack 20 to the housing 12, it is only necessary for the user to put the battery pack 20 in the battery storage portion 12b and to push the slide knob 34 to the position illustrated in FIG. 9.

When the battery pack 20 is unfixed by the fixing component 30, the engaging recess 38b is engaged with the engaging projection 12e, as illustrated in FIG. 20. An end in the X-direction of the engaging recess 38b is inclined, and an end in the X-direction of the engaging projection 12e is also inclined. Therefore, if the engaging plate 38 attempts to move in the direction opposite the X-direction, it moves in the Y-direction along the inclined face, so that the engaging projection 12e and the engaging recess 38b are disengaged from each other. Hence, the user can move the slide knob 34 (fixing component 30) to the fixed position for the battery pack 20 (position of FIG. 9) by simply moving the slide knob 34.

As described above, in the embodiment, the first operating portion 33 including the lever 32 and the engaging plate 38, the second operating portion 35 including the slide knob 34, and the lock lever 36 including the engaging portions 37 are combined into one integral component (fixing component 30). Hence, it is unnecessary to separately mount, in the housing 12, a component including the lever 32 and the engaging plate 38 (that is, a component that permits and inhibits movement of the slide knob 34 including the slide knob 34) and a component including the slide knob 34 and the lock lever 36 (that is, a component to be engaged with the battery pack 20 for fixing). This reduces the number of components and assembly man-hours.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fixing component that fixes a detachable component to a housing of an electronic apparatus, the fixing component comprising:
    a first operating portion including a first engaging portion that engages with a part of the housing that includes a projection, and that permits movement in a second direction intersecting a first direction when the first operating portion receives a first movement operation in the first direction;
    a second engaging portion coupled to the first operating portion and that releases engagement with the detachable component when the first operating portion is moved in the second direction; and
    a second operating portion coupled to the second engaging portion and that receives a second movement operation in the second direction, in the state where the second engaging portion release the engagement,
    wherein the first engaging portion includes two recesses that engage with the projection at different positions in the second direction.

2. The fixing component according to claim 1, wherein each of the two recesses includes a first side face extending in a direction perpendicular to the second direction and a second side face inclined with respect to the second direction.

3. The fixing component according to claim 1, wherein the first operating portion includes an elastic connecting portion that supports the first engaging portion movably in the first direction.

4. The fixing component according to claim 1, wherein the second engaging portion includes an engaging portion that projects in the first direction to engage with a part of the detachable component.

5. An electronic apparatus comprising:
    a component;

a housing to which the component is attached detachably; and a fixing component that fixes the component to the housing, wherein the fixing component includes a first operating portion including a first engaging portion that engages with a part of the housing that includes a projection, and that permits movement in a second direction intersecting a first direction when the first operating portion receives a first movement operation in the first direction, a second engaging portion coupled to the first operating portion and that releases engagement with the detachable component when the first operating portion is moved in the second direction, and a second operating portion coupled to the second engaging portion and that receives a second movement operation in the second direction, in the state where the second engaging portion releases the engagement, and wherein the housing supports the fixing component movably in the second direction and the first engaging portion includes two recesses that engage with the projection at different positions in the second direction.

6. The electronic apparatus according to claim 5, wherein each of the two recesses includes a first side face extending in a direction perpendicular to the second direction and a second side face inclined with respect to the second direction.

7. The electronic apparatus according to claim 5, wherein the first operating portion includes an elastic connecting portion that supports the first engaging portion movably in the first direction.

8. The electronic apparatus according to claim 5, wherein the second engaging portion includes an engaging portion that projects in the first direction to engage with a part of the component.

9. The electronic apparatus according to claim 5, wherein the housing includes a component storage portion that stores the component, and wherein the fixing component extends along the component storage portion.

10. The electronic apparatus according to claim 5, wherein the first operating portion includes a part that is exposed from the housing and receives movement operation in the first direction, and wherein the second operating portion includes a part that is exposed from the housing and receives movement operation in the second direction.

* * * * *